US 8,509,059 B2

(12) United States Patent
Kalyanjeet

(10) Patent No.: US 8,509,059 B2
(45) Date of Patent: Aug. 13, 2013

(54) METHOD FOR OPERATING A VIRTUAL ROUTER REDUNDANCY PROTOCOL ROUTER AND COMMUNICATION SYSTEM THEREFOR

(75) Inventor: Gogoi Kalyanjeet, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 253 days.

(21) Appl. No.: 12/986,605

(22) Filed: Jan. 7, 2011

(65) Prior Publication Data
US 2011/0164494 A1  Jul. 7, 2011

(30) Foreign Application Priority Data

Jan. 7, 2010  (KR) .......................... 10-2010-0001476

(51) Int. Cl.
H04L 12/26  (2006.01)
H04L 12/24  (2006.01)
H04L 12/16  (2006.01)
H04L 1/00  (2006.01)
H04J 1/16  (2006.01)
H04J 3/14  (2006.01)

(52) U.S. Cl.
USPC ........... 370/219; 370/216; 370/217; 370/218; 370/220

(58) Field of Classification Search
USPC .................................................. 370/216–220
See application file for complete search history.

(56) References Cited

U.S. PATENT DOCUMENTS

| 7,433,317 B2 * | 10/2008 | Kobayashi et al. | ........... 370/241 |
| 7,940,678 B2 * | 5/2011 | Tan | ............................... 370/242 |
| 2009/0268607 A1 * | 10/2009 | Wang et al. | ................... 370/218 |

* cited by examiner

Primary Examiner — Un C Cho
Assistant Examiner — Fangyan Deng
(74) Attorney, Agent, or Firm — The Farrell Law Firm, P.C.

(57) ABSTRACT

A method for operating a VRRP router and a communication system therefor, wherein a first router operating as a backup router receives an advertisement message from a second router operating as a master router during a first period, and checks a session state of the second router using a BFD module during a second period that is shorter than the first period. Upon detecting a session down for the second router by the BFD module, the first router compares a time at which the advertisement message was received and a time at which the session down was detected, with the first and second periods, and determines an operation state of the second router according to comparison results. The first router switches from a backup router to a master router, and sends an advertisement message to the second router, if the second router is in a down state.

6 Claims, 5 Drawing Sheets

US 8,509,059 B2

METHOD FOR OPERATING A VIRTUAL ROUTER REDUNDANCY PROTOCOL ROUTER AND COMMUNICATION SYSTEM THEREFOR

PRIORITY

This application claims priority under 35 U.S.C. §119(a) to a Korean Patent Application filed in the Korean Intellectual Property Office on Jan. 7, 2010 and assigned Serial No. 10-2010-0001476, the entire disclosure of which is hereby incorporated by reference.

BACKGROUND OF THE INVENTION

1. Field of the Invention

The present invention relates generally to a communication system using a Virtual Router Redundancy Protocol (VRRP), and more particularly, to a router apparatus using Bi-directional Forwarding Detection (BFD) and an operation method therefor.

2. Description of the Related Art

In general, a plurality of hosts, which are connected by a Local Area Network (LAN) and located in a specific area, select one default router and transmit packets through the router, for communication with an external network. The router receives a packet having its destination address, searches for the shortest route to the destination address, and transmits the data packet through the determined route.

However, if a failure occurs in a default router, e.g., due to a power failure, a reboot, scheduling waiting, etc., hosts may lose the route through which they can communicate with an external network. A method proposed as a solution to these problems may include a Virtual Router Redundancy Protocol (VRRP: RFC2338) and a Hot Standby Router Protocol (HSRP: RFC2281).

In a structure using these protocols, when a host uses a fixedly set default router, it has one master router and one or more backup routers. One or more backup routers refer to a backup group, and one of the backup routers is used for the host.

VRRP defines a dynamic selection protocol that dynamically assigns any one of VRRP routers in the LAN as a virtual router. Because every protocol messaging is performed using an Internet Protocol (IP) multicast datagram, VRRP is a protocol that can be universally applied to all networks supporting IP multicast.

In VRRP, a master router periodically sends an advertisement message to inform backup routers that it is in operation or in an active state, and the backup routers may recognize that the master router is in operation, by receiving the advertisement message from the master router. If a failure occurs in the master router, the master router can no longer deliver the advertisement message. Consequently, when a backup router cannot receive the advertisement message, it detects that a failure has occurred in the master router, and because the backup router is qualified as a master router, then takes the place of the master router. The master router and the backup router use the same virtual Identifier (ID) and the same virtual IP address, and each host sets this virtual IP address as an address of a default gateway.

In router redundancy based on the above-described VRRP, a unit period for which a mater router sends an advertisement message to a backup router is one second, and the backup router determines that a failure has occurred in the master router, if it fails to receive an advertisement message from the master router for three seconds.

In VRRP-based router redundancy, providing quick switching from a backup router to a master router is very important to minimize interruption of services. Therefore, there is a need for a method in which a backup router can detect a failure of a master router within a shorter time.

SUMMARY OF THE INVENTION

The present invention is designed to address at least the above-mentioned problems and/or disadvantages and to provide at least the advantages described below. Accordingly, an aspect of the present invention is to provide an apparatus and method for quickly detecting a failure of a master router by a backup router in a router redundancy system using a VRRP.

Another aspect of the present invention is to provide an apparatus and method for quickly detecting a failure of a master router by a backup router using Bi-directional Forwarding Detection (BFD) in a VRRP-based router redundancy system.

In accordance with an aspect of the present invention, a method is provided for operating a router in a communication system using a VRRP. The method includes receiving, by a first router operating as a backup router, an advertisement message from a second router operating as a master router during a first period; checking a session state of the second router using a BFD module during a second period that is shorter than the first period; upon detecting a session down for the second router, by the BFD module, comparing a time at which the advertisement message was last received and a time at which the session down was detected, with the first and second periods, and determining an operation state of the second router according to comparison results; and if the second router is determined to be in a down state, switching, by the first router, from the backup router to a master router and sending an advertisement message to the second router.

In accordance with another aspect of the present invention, a communication system using a VRRP is provided. The communication system includes a first router operating as a master router, for sending an advertisement message to a backup router during a first period; and a second router operating as a backup router of the first router, for checking a session state of the first router using a BFD module during a second period that is shorter than the first period. Upon detecting a session down for the first router, by the BFD module, the second router compares a time at which the advertisement message was last received and a time at which the session down was detected, with the first and second periods, determines an operation state of the first router according to comparison results, and if the first router is determined to be in a down state, switches from the backup router to a master router, and sends an advertisement message to the first router.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Various embodiments of the present invention will be described in detail below with reference to the accompanying drawings. In the following description, specific details such as detailed configuration and components are merely provided to assist the overall understanding of the embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

In accordance with an embodiment of the present invention, a method is provided for a backup router to detect a failure of a master router by applying BFD to a VRRP-based router redundancy system.

In a VRRP-based router redundancy system, if a failure occurs in a master router, a backup router performs tasks forwarded from the master router, thereby minimizing a data flow interruption. When a failure occurs in the master router, the backup router serves as, or operates as a new master router, if it fails to receive an advertisement message from the master router within a predetermined time.

BFD sets a session to detect a state (Up/Down) of a bi-directional forwarding route between adjacent network devices, and determines an occurrence of a failure (i.e., a Down state) if no BFD control packet is received from the other party within a predetermined time. Therefore, if a BFD session is created by a backup router to monitor a master router, the backup router may detect a failure of the master router more rapidly, and perform a switching operation accordingly.

Figure 1:
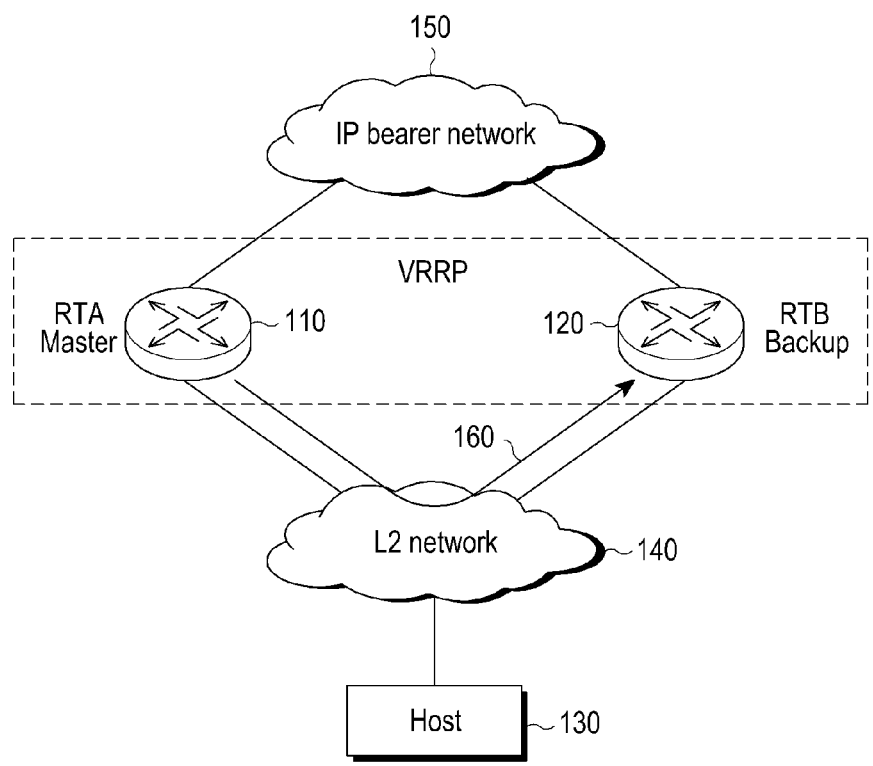
FIG. 1 is a diagram illustrating a conventional router redundancy system using a VRRP.

FIG. 1 illustrates a conventional router redundancy system using a VRRP.

Referring to FIG. 1, a router A (RTA) 110 and a router B (RTB) 120, which use the same virtual ID and the same virtual IP address, are connected to an IP bearer network 150. A host 130 is connected to the RTA 110 and the RTB 120 via a Layer-2 (L2) network 140. The RTA 110, operating as a master router, sends an advertisement message to the RTB 120 or a backup router via the L2 network 140 (See 160). Subsequently, the RTB 120 switches from a backup router to a master router, if it fails to receive an advertisement message from the RTA 110 for three seconds.

Figure 2:
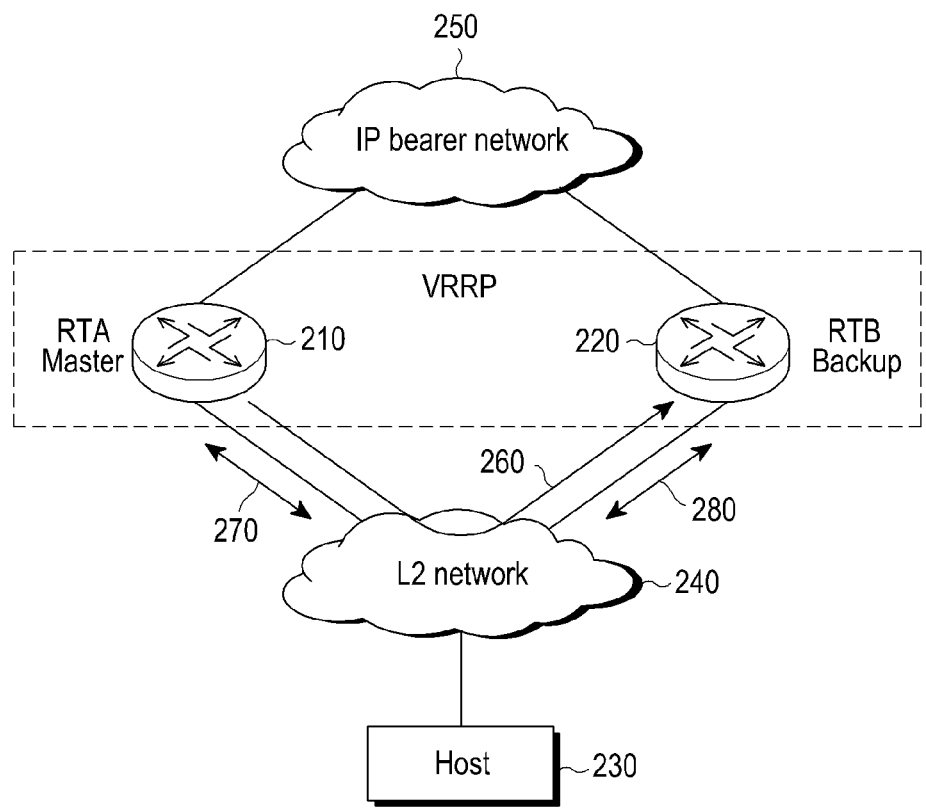
FIG. 2 is a diagram illustrating a VRRP-based router redundancy system using BFD, according to an embodiment of the present invention.

FIG. 2 illustrates a VRRP-based router redundancy system utilizing BFD, according to an embodiment of the present invention.

Referring to FIG. 2, an RTA 210 and an RTB 220 each include a VRRP module and also a BFD module (both not shown). Therefore, the RTA 210 and the RTB 220 exchange BFD packets (See 270 and 280) to check a link state of each other. The BFD packets in 270 and 280 have identical IDs.

A BFD module included in each of the RTA 210 and the RTB 220 informs its VRRP module that a BFD session of the other party's router has been down, using a BFD packet. Additionally, the BFD module informs a session ID and a time ΔbfdT required for detecting the session down. ΔbfdT is generally less than one second.

Upon receiving a report on the BFD session down from the BFD module, a VRRP module in the RTB 220 compares a time T1 at which it last received an advertisement message from the RTA 210, a time T2 at which it was notified of the BFD session down by the BFD module, a time ΔbfdT, and an advertisement message transmission period ΔvrrpT, and determines failure/non-failure of the RTA 210 according to rules as will be described below.

Figure 3:
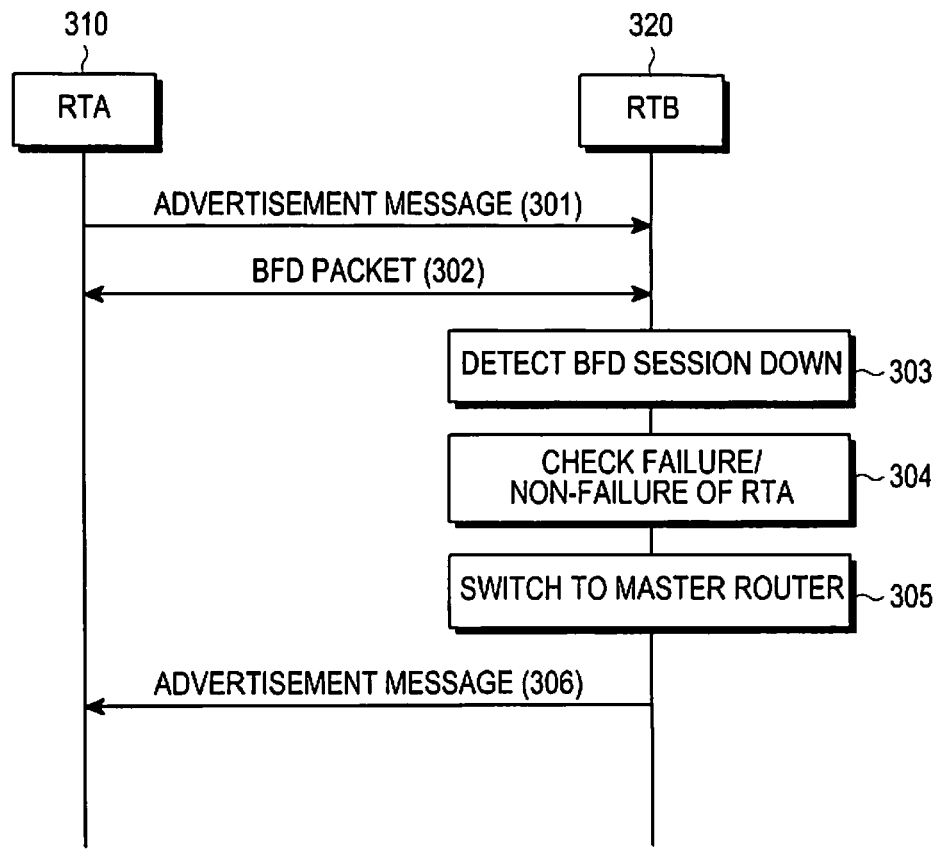
FIG. 3 is a diagram schematically illustrating a failure determining procedure according to an embodiment of the present invention.

FIG. 3 schematically illustrates a failure determining procedure according to an embodiment of the present invention.

Referring to FIG. 3, an RTA 310, i.e., a master router, sends an advertisement message to an RTB 320, i.e., a backup router, during a first predetermined period, in step 301. In step 302, the RTA 310 and the RTB 320 exchange BFD packets during a second predetermined period. The RTB 320 detects a session down of the RTA 310 in step 303, and in step 304, determines failure/non-failure of the RTA 310 by applying the rules as will be described below. If it is determined that a failure has occurred in the RTA 310, the RTB 320 switches from a backup router to a master router in step 305, and sends an advertisement message to the RTA 310 in step 306.

Figure 4:
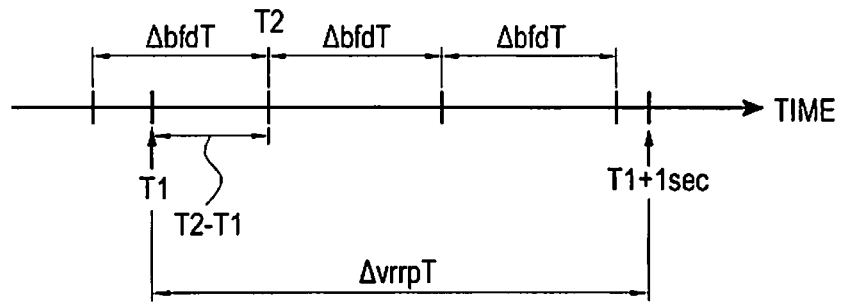
FIG. 4 is a diagram illustrating a first rule for determining failure/non-failure of a master router according to an embodiment of the present invention.

FIG. 4 illustrates a first rule for determining failure/non-failure of a master router according to an embodiment of the present invention.

Referring to FIG. 4, a VRRP module in the RTB 320 last received an advertisement message from the RTA 310 at a time T1, and then received a BFD session-down notification from a BFD module in the RTB 320 at a time T2. After receiving the BFD session-down notification, the VRRP module calculates a time difference between T2 and T1, and compares the time difference with ΔbfdT. In FIG. 4, the time difference between T2 and T1 is less than ΔbfdT, and in this case, the VRRP module continues to operate as a backup router, disregarding the BFD session-down notification received from the BFD module.

Figure 5:
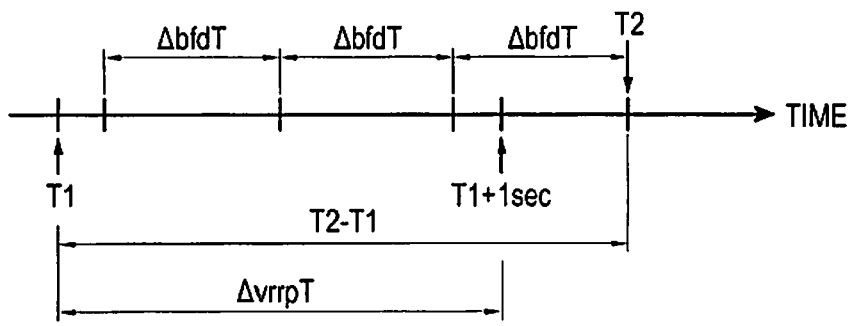
FIG. 5 is a diagram illustrating a second rule for determining failure/non-failure of a master router according to an embodiment of the present invention.

FIG. 5 illustrates a second rule for determining failure/non-failure of a master router according to an embodiment of the present invention.

Referring to FIG. 5, the VRRP module in the RTB 320 last received an advertisement message from the RTA 310 at a time T1, and then received a BFD session-down notification from the BFD module at a time T2. After receiving the BFD session-down notification, the VRRP module calculates a time difference between T2 and T1, and compares the time difference with ΔvrrpT. In FIG. 5, the time difference between T2 and T1 is greater than ΔvrrpT, and in this case, the VRRP module immediately switches the RTB 320 from a backup router to a master router.

Figure 6:
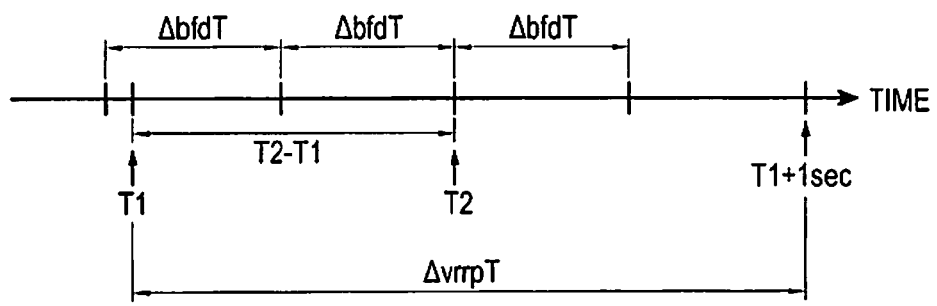
FIG. 6 is a diagram illustrating a third rule for determining failure/non-failure of a master router according to an embodiment of the present invention.

FIG. 6 illustrates a third rule for determining failure/non-failure of a master router according to an embodiment of the present invention.

Referring to FIG. 6, the VRRP module in the RTB 320 last received an advertisement message from the RTA 310 at a time T1, and then received a BFD session-down notification from the BFD module at a time T2. After receiving the BFD session-down notification, the VRRP module calculates a time difference between T2 and T1, and compares the time difference with ΔbfdT and ΔvrrpT. In FIG. 6, the time difference between T2 and T1 is greater than ΔbfdT and less than ΔvrrpT, and in this case, the VRRP module waits until it is scheduled to receive the next advertisement message. Thereafter, if no advertisement message is received and the BFD session is still in a down state, the VRRP module switches the RTB 320 from a backup router to a master router.

The rules of the present invention, as described above with reference to FIGS. 4 to 6, may be summarized as follows.

Rule 1: For T2-T1<ΔbfdT, a BFD session-down notification is disregarded.

Rule 2: For T2-T1>ΔvrrpT, a backup router immediately switches to a master router.

Rule 3: For ΔbfdT<T2-T1<ΔvapT, a backup router waits until it is scheduled to receive the next advertisement message, and if a BFD session is still in a down state even at the time the next advertisement message is received, the backup router switches to a master router More detailed examples of the Rules 1 to 3 will now be described below.

Assuming that ΔbfdT=300 ms, ΔvapT=1000 ms, and T1=5000 ms, if T2=5200 ms, then T2-T1=200 ms, which is less than ΔbfdT. In this case, a BFD session-down notification received at T2 is disregarded, as per Rule 1.

If T2=6200 ms, then T2-T1=1200 ms, which is greater than ΔvrrpT. In this case, a backup router immediately switches to a master router, as per Rule 2. The time required while a backup router switches to a master router is 200 ms, which is less than ΔbfdT.

If T2=5600 ms, then T2-T1=600 ms, which is greater than ΔbfdT and less than ΔvrrpT. In this case, a backup router waits for 400 ms until T1+ΔvapT=6000 ms, and switches to a master router if advertisement message is received at 6000 ms, as per Rule 3. The time required while a backup router switches to a master router is 300 ms (ΔbfdT)+400 ms (waiting time)=700 ms, which is greater than ΔbfdT and less than ΔvrrpT.

When the above-described embodiments of the present invention are applied, the time required when a backup router switches to a master router may be reduced to be shorter than an advertisement message reception period. In addition, even though a BFD session-down notification is received, the backup router does not unconditionally switch to a master router, thereby preventing a router from unnecessarily switching between a backup mode and a master mode.

Figure 7:
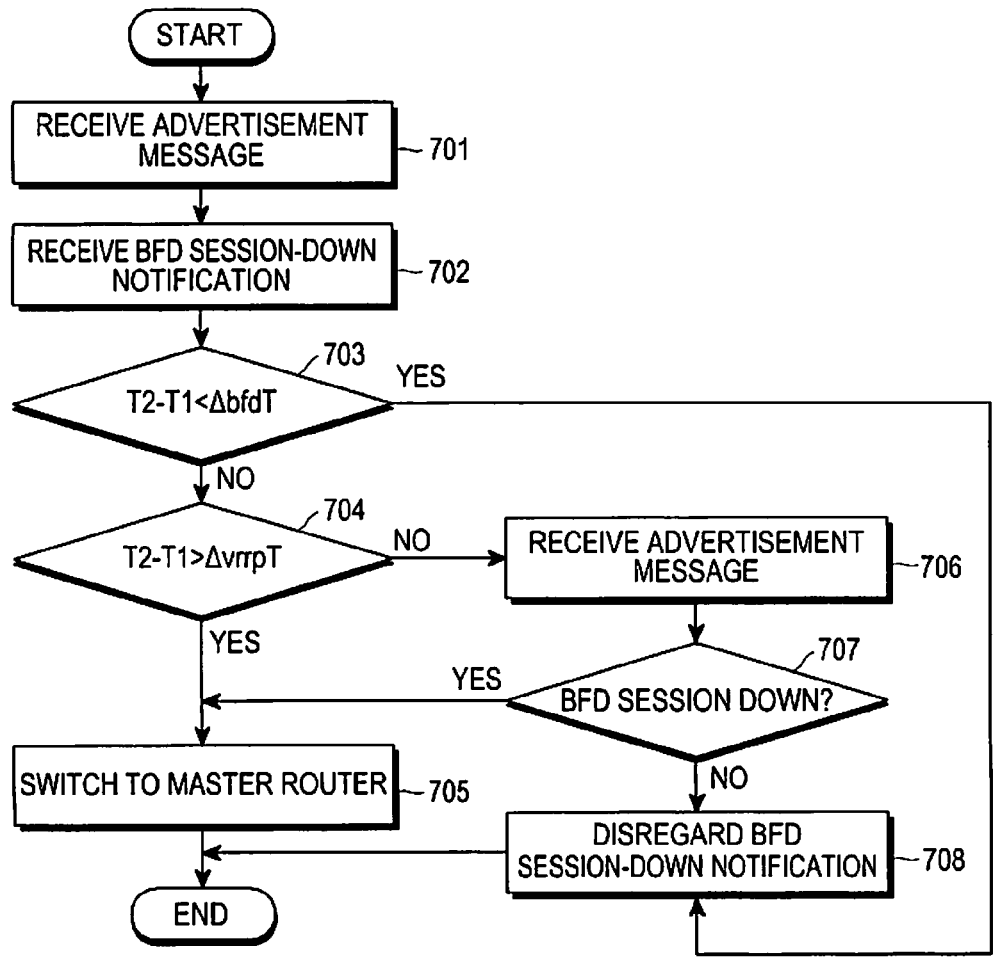
FIG. 7 is a flowchart illustrating an operation of a VRRP module in a backup router according to an embodiment of the present invention.

FIG. 7 illustrates an operation of a VRRP module in a backup router according to an embodiment of the present invention.

Referring to FIG. 7, the VRRP module in the backup router receives an advertisement message from a master router in step 701, and receives a BFD session-down notification for the master router from a BFD module in the backup router in step 702. In step 703, the VRRP module calculates a difference between T2 and T1, and compares the difference with ΔbfdT. If T2-T1 is less than ΔbfdT, the VRRP module continues to operate as a backup router, disregarding the BFD session-down notification in step 708. However, if T2-T1 is greater than or equal to ΔbfdT, the VRRP module compares T2-T1 with ΔvrrpT in step 704.

If T2-T1 is greater than ΔvrrpT, the VRRP module switches from a backup router to a master router in step 705. However, if T2-T1 is less than or equal to ΔvrrpT, the VRRP module waits to receive a next advertisement message from the master router in step 706.

In step 707, the VRRP module determines whether a BFD session of the master router is in a down state. If the master router is still in a down state, the VRRP module switches from a backup router to a master router in step 705, and if not, the VRRP module continues to operate as a backup router, disregarding the BFD session-down notification in step 708.

As is apparent from the foregoing description, according to the above-described embodiments of the present invention, as BFD is applied to a VRRP-based router redundancy system, a backup router may quickly detect a failure of a master router and switch from a backup router to a master router, minimizing data loss.

In addition, even though a BFD session-down notification is received, a backup router does not always switch to a master router, thereby preventing a router from unnecessarily switching between a backup mode and a master mode.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for operating a router in a communication system using a Virtual Router Redundancy Protocol (VRRP), comprising:
   receiving, by a first router operating as a backup router, an advertisement message from a second router operating as a master router during a first period;
   checking, by the first router, a session state of the second router using a Bi-directional Forwarding Detection (BFD) module during a second period that is shorter than the first period;
   upon detecting a session down for the second router by the BFD module, comparing a difference between a time at which the advertisement message was last received and a time at which the session down was detected, with the first and second periods, and determining an operation state of the second router according to comparison results; and
   if the second router is in a down state based on the comparison results, switching, by the first router, from the backup router to a master router, and sending an advertisement message to the second router.

2. The method of claim 1, wherein determining the operation state of the second router according to the comparison results comprises:
   comparing a the difference between the time at which the session down was detected and the time at which the advertisement message was last received, with the second period;
   disregarding the detection of the session down by the BFD module, if the difference is less than the second period;
   comparing the difference with the first period, if the difference is greater than or equal to the second period;
   determining that the second router is in a down state, if the difference is greater than the first period; and
   waiting until a next advertisement message is to be received from the second router, if the difference is greater than or equal to the second period, and less than the first period.

3. The method of claim 2, further comprising:
   upon receiving the next advertisement message from the second router during the waiting;
   checking a BFD session state of the second router, detected by the BFD module;
   if the BFD session state of the second router corresponds to the down state, determining that the second router is in the down state; and disregarding the detection of the session down by the BFD module, if a BFD session state of the second router does not correspond to the down state.

4. A communication system using a Virtual Router Redundancy Protocol (VRRP), comprising:
- a first router operating as a master router, for sending an advertisement message to a backup router during a first period; and
- a second router operating as the backup router of the first router, for checking a session state of the first router using a Bi-directional Forwarding Detection (BFD) module during a second period that is shorter than the first period,
- wherein upon detecting a session down for the first router by the BFD module, the second router compares a difference between a time at which the advertisement message was last received and a time at which the session down was detected, with the first and second periods, determines an operation state of the first router according to comparison results, and if the first router is determined to be in a down state according to the comparison results, switches from the backup router to a master router, and sends an advertisement message to the first router.

5. The communication system of claim 4, wherein the second router
compares the difference between the time at which the session down was detected and the time at which the advertisement message was last received, with the second period, and disregards the detection of the session down by the BFD module, if the difference is less than the second period, compares the difference with the first period, if the difference is greater than or equal to the second period, and determines that the first router is in the down state, if the difference is greater than the first period, and waits until a next advertisement message is to be received from the first router, if the difference is greater than or equal to the second period, and less than the first period.

6. The communication system of claim 5, wherein upon receiving the next advertisement message from the first router, the second router
checks a BFD session state of the first router, detected by the BFD module, and determines that the first router is in the down state, if the BFD session state of the first router corresponds to the down state, and disregards the detection of the session down by the BFD module, if the BFD session state of the first router does not correspond to the down state.

* * * * *